United States Patent [19]

Hsu et al.

[11] 4,378,049

[45] Mar. 29, 1983

[54] METHODS, ADDITIVES AND COMPOSITIONS FOR TEMPORARILY SEALING HIGH TEMPERATURE PERMEABLE FORMATIONS

[75] Inventors: Hui-Min Hsu, Duncan; John W. Burnham, Bethany, both of Okla.

[73] Assignee: Halliburton Company, Duncan, Okla.

[21] Appl. No.: 295,190

[22] Filed: Aug. 21, 1981

[51] Int. Cl.$^3$ .......................... C08L 1/08; C08L 5/00; E21B 33/138

[52] U.S. Cl. .................................. 166/295; 106/194; 106/208; 166/294; 252/8.5 LC; 524/55

[58] Field of Search ................. 252/8.5 LC; 166/293, 166/294, 295; 106/208, 194; 524/55

[56] References Cited

U.S. PATENT DOCUMENTS 3,740,360 6/1973 Nimerick et al. ............. 252/8.5 LC
3,766,984 10/1973 Nimerick ....................... 166/294
4,144,179 3/1979 Chatterji ........................ 106/208

OTHER PUBLICATIONS

Chem. Abst.: 80:110613m.

*Primary Examiner*—Theodore Morris
*Attorney, Agent, or Firm*—Robert A. Kent; Thomas R. Weaver

[57] ABSTRACT

Methods, additives and compositions for selectively temporarily sealing high temperature permeable formations penetrated by well bores. The compositions are formed by dispersing a granular additive into an aqueous medium which contains a galactomannan gum treated with potassium pyroantimonate whereby the hydration rate of the gum is retarded at temperatures below about 120° F. but increases at temperatures thereabove. When the composition is introduced into a high temperature permeable formation, it is heated whereby the treated galactomannan gum hydrates and the composition is formed into a stiff gel.

25 Claims, No Drawings

METHODS, ADDITIVES AND COMPOSITIONS FOR TEMPORARILY SEALING HIGH TEMPERATURE PERMEABLE FORMATIONS

The present invention relates to solid granular additives, aqueous compositions formed from such additives and methods of using such additives and compositions for temporarily sealing high temperature permeable formations penetrated by well bores.

In the drilling, completion and operation of oil, gas and water wells, it is often necessary or desirable to temporarily seal or plug one or more zones in permeable formations penetrated by the well bores. Highly permeable zones or formations are often temporarily sealed or plugged so that other less permeable zones or formations can be treated without setting or resetting packer apparatus, etc. For example, in fracturing, acidizing and other similar production stimulation techniques, it is often necessary to seal or plug highly permeable formations in order to divert treating fluids to less permeable formations in which the fracturing, acidizing or other procedure is to be carried out. In addition, plugging or diverting agents are commonly utilized for temporarily sealing one formation in a well while testing or completing another formation, for temporarily sealing a thief zone or a water zone, etc.

A variety of methods and compositions have heretofore been employed for temporarily plugging or sealing such permeable zones or formations in wells, including the use of fibrous, flakey or granular plugging agents, cements and viscous gels. The use of viscous gels as sealing agents is advantageous in that they usually can be caused to revert to relatively thin fluids after a period of time and thereby are easily removed.

Water base gel compositions utilized heretofore have included high molecular weight hydratable organic compounds which upon being hydrated from stiff gels. Cross-linking agents have also been utilized in such compositions which cause the hydrated compounds to cross-link and thereby stiffen or rigidify the gels further. Aqueous compositions of this type are initially relatively viscous liquids that quickly become stiff gels. The rapid gelling of the compositions has made placement of the compositions in desired subterranean zones or formations very difficult. When such compositions are utilized or attempted to be utilized in high temperature subterranean zones or formations, the high temperatures encountered often cause the gels formed to revert to thin fluids very quickly, often so quickly that the sealing or plugging of the zones or formations by the gels is ineffective. The term "high temperature permeable formation" is used herein to mean a subterranean zone or formation having a naturally existing temperature above about 140° F.

In the plugging or sealing of high temperature permeable formations, there is a need for a composition that can be implaced as a readily pumpable slurry and after implacement sets up to form a mass capable of withstanding an appreciable pressure in the presence of high temperatures for an appreciable length of time. The stiff gel or mass must also be capable of being liquified after a desired period of time and removed from the temporarily sealed formation.

Aqueous gel compositions comprised of one or more galactomannan gums which have been treated whereby they are rendered hydrophobic in an alkaline aqueous solution, but hydrophillic in an acidic aqueous solution have been developed and used in sealing subterranean permeable zones and formations. That is, the treated galactomannan gum is dispersed into an alkaline aqueous medium whereby the gum is not readily hydrated, pumped into a subterranean formation and then the aqueous medium is allowed to or caused to become acidic whereby the gum is hydrated and a stiff gel is formed. Such heretofore used methods and compositions have often proved to be unsatisfactory due to ineffective control of the pH of the composition resulting in premature gelation, and when used in high temperature formations, weak gels or gels having low resistance to elevated temperatures are often formed.

By the present invention, methods, additives and compositions for temporarily sealing high temperature permeable formations are provided which have predictable gelation and break times and which form stiff gels which are stable in high temperature environments and which can be caused to remain in such environments for extended periods of time.

The present invention comprises solid granulated additives which can be premixed and stored prior to use, aqueous compositions formed from the additives and methods of sealing high temperature permeable subterranean formations employing the compositions.

The granulated additives of the invention are comprised of one or more galactomannan gums which have been treated with potassium pyroantimonate whereby the hydration rates thereof are retarded. That is, when such treated gums are dispersed into an aqueous medium having a pH above about 10 and having a temperature below about 120° F., the rate of hydration of the gums is very slow, but when the temperature of the aqueous medium is raised to above about 120° F., the rate of hydration increases. One or more water soluble gelling agents are also included in the additives which hydrate rapidly when the additives are dispersed into aqueous mediums to thereby increase the viscosity of the resulting aqueous compositions and maintain the dispersed gums therein in suspension while still being readily pumpable.

The aqueous compositions formed as a result of dispersing the additives into aqueous mediums can be pumped into high temperature permeable zones or formations and upon being heated by the formations form stiff gels which seal the zones or formations. To remove the gels, they can be contacted with acid or allowed to remain in the zones or formations for periods of time whereby they degrade and revert to thin fluids.

Galactomannan gums are naturally occurring polysaccharides which are primarily composed of D-mannos and D-galactose units. The gums are soluble in water and form thick, highly viscous solutions in water, i.e., the gums hydrate in water. The gums are derived from various endosperms of seeds and examples are tara, locust bean, guar, paloverde, honey locust, Japanese pagoda, prairie mimosa, indigo, lucerne, etc. Such gums are generally provided by the manufacturers thereof in solid particulate form.

When galactomannan gums are treated with potassium pyroantimonate, the natural hydrophilic properties of the gums are inhibited when the gum is dispersed in an aqueous medium having a pH above about 10 and a temperature below about 120° F. That is, the hydration rate of the gum is very slow in such an aqueous medium. When the aqueous medium in which the gum is dispersed is heated to a temperature above about 120° F., the hydration rate of the gum increases and depending upon the quantity of potassium pyroantimonate utilized in the treatment of the gum, the hydration of the gum reaches a rapid rate at a temperature in the range of from about 150° F. to about 400° F.

When such treated gums are dispersed in aqueous media in sufficient amounts and the gums are hydrated, stiff gels are formed which are particularly suitable for temporarily sealing high temperature permeable zones and formations penetrated by well bores. In accordance with this invention, the pH of the gels is maintained above about 10 by including a pH control agent which functions as a buffering agent in the aqueous gel forming compositions and additives for forming such compositions. The gels formed by aqueous solutions of galactomannan gums degrade in high temperature environments to produce organic acids which in turn lower the pH of the gels causing more rapid degradation. By the inclusion of a pH control agent, i.e., a buffering agent, in the gel, the organic acids are neutralized as they are formed and the stability and duration of the gel is increased.

The degree of retardation, i.e., the slowness of the hydration rate of the potassium pyroantimonate treated galactomannan gum depends on the extent of the treatment. The treatment is carried out by reacting the gum in an aqueous solution containing various concentrations of potassium pyroantimonate. The concentration of potassium pyroantimonate can be varied from about 0.001% to about 0.3% based on the weight of the galactomannan gum. The more potassium pyroantimonate used in the reaction the greater the degree of retardation, i.e., increasing the quantity of potassium pyroantimonate utilized in the reaction increases the temperature required for the hydration of the gum to reach a rapid rate. For example, when hydroxypropylguar gum is reacted with potassium pyroantimonate in a quantity of 0.02% by weight of the gum, the hydration of the gum in an aqueous solution having a pH above about 10 is rapid at a temperature in the range of from about 150° F. to about 175° F. When hydroxypropyl guar gum is reacted with potassium pyroantimonate in a quantity of 0.2% by weight of the gum, the hydration of the gum is not rapid until a temperature in the range of from about 300° F. to about 325° F. is reached.

In addition to the potassium pyroantimonate treated gum or gums, the additives and compositions of this invention include one or more water soluble gelling agents which hydrate rapidly to increase the viscosities of the compositions whereby the treated gum dispersed therein is maintained in suspension, but the composition are still readily pumpable. A variety of gelling agents can be utilized which are rapidly hydrated in an aqueous medium having a pH above about 10. Examples of such gelling agents are hydratable synthetic polymers such as polyacrylamide and polymethacrylamide, and hydratable polysaccharides such as hydratable cellulose derivatives, e.g., hydroxyethyl cellulose, carboxymethyl cellulose, carboxymethylhydroxyethyl cellulose and methyl cellulose. Of these, hydroxyethyl cellulose, carboxymethyl cellulose and carboxymethylhydroxyethyl cellulose are preferred, with hydroxyethyl cellulose being the most preferred.

As indicated above, in order to provide and maintain an aqueous medium and composition pH above about 10, the additives and compositions of this invention include a pH control agent, i.e., a compound or mixture of compounds which when combined with the aqueous medium provide a pH above about 10 and function as a buffering agent to provide stability to the gel formed. A variety of compounds can be utilized for such purpose examples of which are magnesium oxide, sodium hydroxide and sodium carbonate. Of these, sodium carbonate is preferred.

In order to form the stiff gels required for sealing permeable subterranean zones or formations, the aqueous gel compositions of the present invention include one or more potassium pyroantimonate treated galactomannan gums in amounts in the range of from about 2.3% to about 6.7% by weight thereof. Preferably, the compositions include treated galactomannan gum or gums in amounts in the range of from about 3.2% to about 5.8% by weight. In order to provide initial viscosities to the compositions in the range of from about 35 to about 70 cps. at a temperature of 80° F. measured on a FANN viscometer at 300 RPM using a No. 1 spring, standard bob, and standard sleeve for maintaining the dispersed retarded gums in suspension, one or more of the gelling agents described above are provided in the compositions in amounts in the range of from about 0.04% to about 0.8% by weight of the compositions, preferably in the range of from about 0.23% to about 0.54% by weight.

The aqueous medium utilized in the compositions can be fresh water or water containing one or more salts in concentrations up to saturation, e.g., brines or seawater. Depending upon the particular aqueous medium utilized, a quantity of pH control agent is included in the compositions to provide and maintain a pH above about 10, preferably in the range of from about 10 to about 12. Generally, the pH control agent is present in the compositions in amounts in the range of from about 0.4% to about 3.1% by weight of the compositions. However, if it is desirable or required that the gel formed from the composition have extra stability, i.e., a long duration, additional pH control agent for buffering the composition can be included therein.

The solid granular additives of the present invention which can be premixed and stored for long periods of time preferably include one or more potassium pyroantimonate treated galactomannan gums, one or more gelling agents and one or more pH control agents. The treated galactomannan gum or gums are present in the additives in amounts in the range of from about 50% to about 90% by weight of the additives, preferably in the range of from about 70% to about 74% by weight, and most preferably in an amount of about 72% by weight. The gelling agent or agents are present in the additives in amounts such that the weight ratio of gelling agent to treated gum in the additive is in the range of from about 0.014 to about 0.14, i.e., the gelling agent or agents are present in the additives in amounts in the range of from about 1% to about 10% by weight of the additives. Most preferably, gelling agents are present in the additives in amounts whereby the weight ratio of gelling agent to treated gum therein is about 0.083, i.e., the gelling agent are present in the additive in an amount of about 6% by weight of the additives.

The amount of pH control agent in the additive can vary depending upon the particular agent utilized and other factors, but generally is present in amounts in the range of from about 10% to about 40% by weight of the additives.

A particularly preferred additive is comprised of hydroxypropylguar gum reacted or treated with potassium pyroantimonate in a quantity of 0.35% by weight of the gum, present in the additive in an amount of about 72% by weight of the additive, hydratable hydroxyethylcellulose gelling agent present in the additive in an amount of about 6% by weight and and sodium carbonate pH control agent present in the additive in an amount of about 22% by weight.

In carrying out the methods of the present invention for temporarily sealing high temperature permeable formations, an additive of the present invention is dispersed into an aqueous medium having a temperature below about 120° F. to form a sealing composition having a pH above about 10. Generally, the additive is dispersed into the aqueous medium in an amount in the range of from about 4.5% to about 7.8% by weight of the resulting suspension, i.e., 400 lbs. to about 700 lbs. of additive per 1000 gallons of aqueous medium resulting in an aqueous composition containing dispersed treated gum in an amount in the range of from about 3.3% to about 5.6% by weight of the composition, gelling agent in an amount of about 0.27% to about 0.46% by weight, and pH control agent in an amount in the range of from about 1.0% to about 1.7% by weight. The gelling agent in the additive imparts a viscosity to the composition in the range of from about 35 to about 70 cps. whereby the granulated treated gum dispersed therein is maintained in suspension in the composition. The aqueous composition is then pumped into a selected high temperature permeable zone or formation and upon placement of the composition it is heated by the formation to a temperature above about 120° F. Upon heating, the composition forms a stiff gel which functions to seal the zone or formation.

The length of time the stiff gel remains in the formation can be varied by varying the quantity of pH control agent included in the composition. For example, the composition described immediately above forms a stiff gel in a permeable formation having a temperature of 350° F. and remain therein for a period of time in the range of from about 24 to about 60 hours before degredation of the gel takes place to the extent that the gel reverts to a relatively thin fluid. If a longer gel duration is required, additional pH control agent can be included in the composition. As indicated above, if it is desirable or required that the gel formed in a formation be removed prior to its natural degredation, the gel can be contacted with an acid to cause it to break and revert to a relatively thin liquid.

In order to facilitate a clear understanding of the additives, compositions and methods of the present invention, the following examples are given.

EXAMPLE 1

Aqueous sealing compositions of this invention are prepared by adding various amounts of 0.1% by weight potassium pyroantimonate treated hydroxypropylguar gum, hydratable hydroxyethylcellulose gelling agent and various amounts of sodium carbonate to fresh water in a Waring Blender and mixed for 5 minutes. 20 ml. samples of each composition are placed in a suitable receptacle which is in turn placed in a heated oil bath wherein they are heated to a temperature of 250° F. The "break times", i.e., the times between when the compositions are placed in the heated oil bath and when the gels formed revert to liquids which are pourable, are noted. The results of these tests are given in Table I below.

TABLE I

| SEALING COMPOSITION BREAK TIMES AT 250° F. | | | |
|---|---|---|---|
| Quantity of Treated Gum In Composition, lb/1000 gal of Water | Quantity of Gelling Agent In Composition, lb/1000 gal of Water | Quantity of pH Control Agent in Composition, lb/1000 gal. of water | Break Time Hr. |
| 400 | 40 | 0 | 336 |
| 400 | 40 | 200 | 1000 |
| 600 | 40 | 0 | 453 |
| 600 | 40 | 200 | 1000 |

EXAMPLE 2

The procedure of Example 1 is repeated except that the compositions are heated to a temperature of 300° F. The results of these tests are given in Table II below.

TABLE II

| SEALING COMPOSITION BREAK TIMES AT 300° F. | | | |
|---|---|---|---|
| Quantity of Treated Gum In Composition, lb/1000 gal of Water | Quantity of Gelling Agent In Composition, lb/1000 gal of Water | Quantity of pH Control Agent in Composition, lb/1000 gal. of water | Break Time Hr. |
| 400 | 40 | 0 | 13.5 |
| 400 | 40 | 50 | 218 |
| 500 | 40 | 200 | 380 |
| 600 | 40 | 0 | 16.5 |
| 600 | 40 | 50 | 222 |

EXAMPLE 3

The procedure of Example 1 is repeated except that the compositions are heated to a temperature of 350° F. The results of these tests are given in Table III below.

TABLE III

| SEALING COMPOSITION BREAK TIMES AT 350° F. | | | |
|---|---|---|---|
| Quantity of Treated Gum In Composition, lb/1000 gal of Water | Quantity of Gelling Agent In Composition, lb/1000 gal of Water | Quantity of pH Control Agent in Composition, lb/1000 gal. of water | Break Time Hr. |
| 300 | 40 | 100 | 39 |
| 300 | 40 | 150 | 42 |
| 300 | 40 | 200 | 45 |
| 400 | 40 | 100 | 46 |
| 400 | 40 | 150 | 54 |
| 400 | 40 | 200 | 54 |
| 500 | 40 | 100 | 42 |
| 500 | 40 | 150 | 65 |
| 500 | 40 | 200 | 65 |
| 600 | 40 | 0 | 72 |
| 600 | 40 | 200 | 88 |

From Tables I, II, and III, it can be seen that increasing the quantity of pH control agent (sodium carbonate) in the compositions increases the break times of the compositions. Further, the excellent stability of the gels at high temperatures is demonstrated.

EXAMPLE 4

A solid granular additive of this invention containing 72% by weight 0.035% by weight potassium pyroantimonate treated hydroxypropylguar gum, 22% by weight sodium carbonate and 6% by weight hydratable hydroxyethylcellulose is prepared. Various quantities of such additive are combined with fresh water to form sealing compositions which are tested in accordance with the procedure of Example 1 at various temperatures. The results of these tests are given in Table IV below.

TABLE IV
SEALING COMPOSITION BREAK TIMES AT VARIOUS TEMPERATURES

| Quantity of Additive In Composition, lb/1000 gal. of Water | Test Temperature, °F. | Break Time, Days |
|---|---|---|
| 400 | 200 | 30 |
| 500 | 200 | 30 |
| 600 | 200 | 30 |
| 700 | 200 | 30 |
| 500 | 250 | 30 |
| 600 | 250 | 30 |
| 700 | 250 | 30 |
| 500 | 300 | 13 |
| 600 | 300 | 14 |
| 700 | 300 | 15 |
| 600 | 350 | 2 |
| 700 | 350 | 2 |

From Table IV the excellent stability of the sealing compositions formed from the additives of the present invention at high temperatures can be seen.

EXAMPLE 5

Various quantities of the additive of Example 4 are combined with fresh water to form sealing compositions. The sealing compositions are tested for set time at various temperatures using a cement consistometer wherein a 500 ml sample of each composition is placed in a metal container and placed in an oil bath with controlled heating rate. Set time is defined as the time between when the sealing composition is placed in a high temperature environment and when it reaches an apparent viscosity of 70 poise. The results of these tests are given in Table V below.

TABLE V
SEALING COMPOSITION SET TIMES AT BOTTOM HOLE CONDITIONS

| Quantity of Additive in Composition, lb/1000 gal. Water | Heating Rate, °F./min. | Bottom Hole Temp, °F. | Bottom Hole Pressure, psi | Set Time, Min. |
|---|---|---|---|---|
| 700 lb L.B. | 2.42 | 206 | 13,390 | 60 |
| 700 lb L.B. | 3.47 | 340 | 21,970 | 52 |
| 700 lb L.B. | 5.54 | 213 | 11,800 | 60 |
| 700 lb L.B. | 5.67 | 301 | 19,000 | 39 |

EXAMPLE 6

Various quantities of the additive of Example 4 are combined with fresh water, fresh water containing 2% by weight potassium chloride and saturated brine to form sealing compositions. The analysis of the brine used is as follows:

| Component | % by Weight |
|---|---|
| KCl | 2 |
| NaCl | 26 |

Each of the sealing compositions formed is tested to determine the rates of hydration thereof at ambient temperature by determining the apparent viscosities of the compositions at various times after they are prepared. The results of these tests are given in Table VI below.

TABLE VI
SEALING COMPOSITION HYDRATION RATES AT AMBIENT TEMPERATURE

| Quantity of Additive in Composition, lb/1000 gal of Water | Aqueous Medium Used | pH of Composition | Apparent Viscosity, centipoises | | | | | | | | |
|---|---|---|---|---|---|---|---|---|---|---|---|
| | | | 0.1 hr. | 0.5 hr. | 1 hr. | 2 hrs. | 3 hrs. | 4 hrs. | 6 hrs. | 24 hrs. | 48 hrs. |
| 500 | Fresh Water | 10.92 | 28 | 32 | 36 | 37 | 37 | 38 | 39 | 44 | 51 |
| 600 | Fresh Water | 11.0 | 42 | 45 | 48 | 51 | 53 | 54 | 55 | 62 | 67 |
| 700 | Fresh Water | 10.26 | 59 | 70 | 72 | 73 | 73 | 76 | 77 | 88 | 102 |
| 500 | Fresh Water 2% by Weight KCl in Fresh Water | .97 | 32 | 33 | 36 | 37 | 38 | 39 | 39 | 46 | 56 |
| 600 | 2% by Weight KCl in Fresh Water | .77 | 45 | 45 | 51 | 52 | 52 | 54 | 55 | 65 | 78 |
| 700 | 2% by Weight KCl in Fresh Water | 10.97 | 56 | 64 | 69 | 72 | 73 | 75 | 77 | 93 | 109 |
| 500 | Brine | 10.75 | 30 | 31 | 35 | 38 | 39 | 40 | 43 | 51 | 63 |
| 600 | Brine | 10.75 | 40 | 41 | 50 | 52 | 53 | 53 | 56 | 67 | 82 |
| 700 | Brine | 10.88 | 58 | 60 | 65 | 67 | 76 | 76 | 78 | 95 | 112 |

From Tables V and VI above it can be seen that the sealing compositions of this invention set in relatively short periods of time when heated under bottom hole conditions and that they hydration rates of the compositions are retarded until heated whereby the compositions are readily pumpable for relatively long periods of time.

What is claimed is:

1. An aqueous composition for temporarily sealing high temperature permeable formations comprising:
   an aqueous medium which contains a pH control agent present in an amount sufficient to maintain the pH of said composition above about 10;

a galactomannan gum which has been treated with potassium pyroantimonate whereby the hydration rate of said gum is retarded at temperatures below about 120° F. but the rate of hydration increases at temperatures thereabove, said treated gum being present in said composition in an amount whereby upon the hydration thereof said composition is formed into a stiff gel; and a water soluble gelling agent which hydrates rapidly in said aqueous medium present in said composition in an amount sufficient to increase the viscosity of said composition whereby said gum is suspended therein but said composition is still readily pumpable.

2. The composition of claim 1 wherein said treated galactomannan gum is selected from the group selected from the group consisting of hydroxypropylguar gum, hydroxyethyl guar gum, carboxymethyl hydroxypropyl guar gum, and carboxymethyl hydroxypropyl guar gum.

3. The composition of claim 2 wherein said gelling agent is selected from the group consisting of polymethacrylamide, polyacrylamide and hydratable cellulose derivatives.

4. The composition of claim 1 wherein said pH control agent is selected from the group consisting of sodium carbonate, magnesium oxide, and sodium hydroxide.

5. The composition of claim 3 wherein said galactomannan gum is present in said composition in an amount in the range of from about 2.3% to about 6.7% by weight of said composition.

6. The composition of claim 5 wherein said gelling agent is present in said composition in the range of from about 0.04% to about 0.08% by weight of said composition.

7. The composition of claim 6 wherein said composition is further characterized to include a pH control agent selected from the group consisting of sodium casrbonate, magnesium oxide, and sodium hydroxide, present in said composition in an amount in the range of from about 0.4% to about 3.1% by weight of said composition.

8. The composition of claim 1 wherein said treated galactomannan gum is hydroxypropyl guar gum present in an amount in the range of from about 3.2% to about 5.8% by weight of said composition and said gelling agent is hydroxyethyl cellulose present in an amount in the range of from about 0.23% to about 0.54% by weight of said composition.

9. The composition of claim 8 which is further characterized to include a pH control agent and said pH control agent is sodium carbonate present in said composition in an amount in the range of from about 0.4% to about 3.1% by weight of said composition.

10. A granulated additive which when dispersed in an aqueous medium forms a viscous slurry suitable for introduction into a high temperature permeable formation and which when heated by the formation sets up into a stiff gel temporarily sealing the formation comprising:

a particulate galactomannan gum which has been treated with potassium pyroantimonate whereby when said gum is dispersed in an aqueous medium having a pH above about 10 and a temperature below about 120° F., the rate of hydration of said gum is retarded but when said aqueous medium containing said gum is heated to temperatures above about 120° F. the rate of hydration of said gum increases;

a water soluble gelling agent which hydrates rapidly in said aqueous medium to increase the viscosity thereof and maintain said particulate treated gum in suspension therein present in said additive in an amount whereby the weight ratio of gelling agent to treated galactomannan gum in said additive is in the range of from about 0.014 to about 0.14; and a pH control agent of a type and present in said additive in an amount effective to provide and maintain an aqueous medium pH of above about 10.

11. The additive of claim 10 wherein said galactomannan gum is selected from the group consisting of hydroxypropylguar gum, hydroxyethyl guar gum, carboxymethylhydroxypropyl guar gum, and carboxyethylhydroxypropyl guar gum.

12. The additive of claim 11 wherein said gelling agent is selected from the group consisting of hydroxyethyl cellulose, carboxymethyl cellulose and carboxymethylhydroxyethyl cellulose.

13. The additive of claim 12 wherein said pH control agent is selected from the group consisting of sodium carbonate, magnesium oxide and sodium hydroxide.

14. The additive of claim 10 wherein said treated galactomannan gum is hydroxypropylguar gum and is present in said additive in an amount in the range of from about 50% to about 90% by weight of said additive.

15. The additive of claim 14 wherein said gelling agent is hydroxyethylcellulose and is present in said additive in an amount in the range of from about 1% to about 10% by weight of said additive.

16. The additive of claim 15 wherein said pH control agent is sodium carbonate and is present in said additive in an amount in the range of from about 10% to about 40% by weight of said additive.

17. A method of temporarily sealing a high temperature permeable formation comprising the steps of:

dispersing a granular additive into an aqueous medium having a pH maintained above about 10 and a temperature below about 120° F., said additive comprising:

a particulate galactomannan gum which has been treated with potassium pyroantimonate whereby when said gum is dispersed in an aqueous medium having a pH above about 10 and a temperature below about 120° F., the rate of hydration of said gum is retarded, but when said aqueous medium containing said gum is heated to temperatures above about 120° F. the rate of hydration of said gum increases;

a water soluble gelling agent which hydrates rapidly in said aqueous medium to increase the viscosity thereof and maintain said particulate treated gum in suspension therein present in said additive in an amount whereby the weight ratio of gelling agent to treated galactomannan gum in said additive is in the range of from about 0.014 to about 0.14; and introducing the resultant aqueous suspension of treated gum into said high temperature permeable formation whereby said aqueous suspension is heated above about 120° F. and said treated gum is hydrated to form a stiff gel which temporarily seals said formation.

18. The method of claim 17 wherein said additive is further characterized to include a pH control agent of a type and present in said additive in an amount effective to provide and maintain an aqueous medium pH of above about 10.

19. The method of claim 17 wherein said treated galactomannan gum is selected from the group consisting of hydroxypropylguar gum, hydroxyethyl guar gum and carboxyethylhydroxypropyl guar gum.

20. The method of claim 19 wherein said gelling agent is selected from the group consisting of hydroxyethyl cellulose, carboxymethyl cellulose and carboxymethylhydroxyethyl cellulose.

21. The method of claim 18 wherein said pH control agent is selected from the group consisting of sodium carbonate, magnesium oxide, and sodium hydroxide.

22. The method of claim 21 wherein said additive is dispersed in said aqueous medium in an amount in the range of from about 4.5% to about 7.8% by weight of the resulting aqueous suspension.

23. The method of claim 22 wherein said treated galactomannan gum in said additive is hydroxy propyl guar gum and is present in said additive in an amount in the range of from about 50% to about 90% by weight of said additive.

24. The method of claim 23 wherein said gelling agent is hydroxyethylcellulose and is present in said additive in an amount in the range of from about 1% to about 10% by weight of said additive.

25. The method of claim 24 wherein said pH control agent is sodium carbonate and is present in said additive in an amount in the range of from about 10% to about 40% by weight of said additive.

* * * * *

UNITED STATES PATENT AND TRADEMARK OFFICE
CERTIFICATE OF CORRECTION

PATENT NO. : 4,378,049
DATED : March 29, 1983
INVENTOR(S) : Hui-Min Hsu and John W. Burnham It is certified that error appears in the above-identified patent and that said Letters Patent is hereby corrected as shown below:

Column 1, line 38, "from" should read -- form --.
Column 9, line 35, "0.08% between the words "about" and "by" should read -- 0.8% --.

Signed and Sealed this

Twenty-first Day of June 1983

[SEAL]

Attest:

DONALD J. QUIGG

Attesting Officer

Acting Commissioner of Patents and Trademarks